United States Patent Office 2,797,191
Patented June 25, 1957

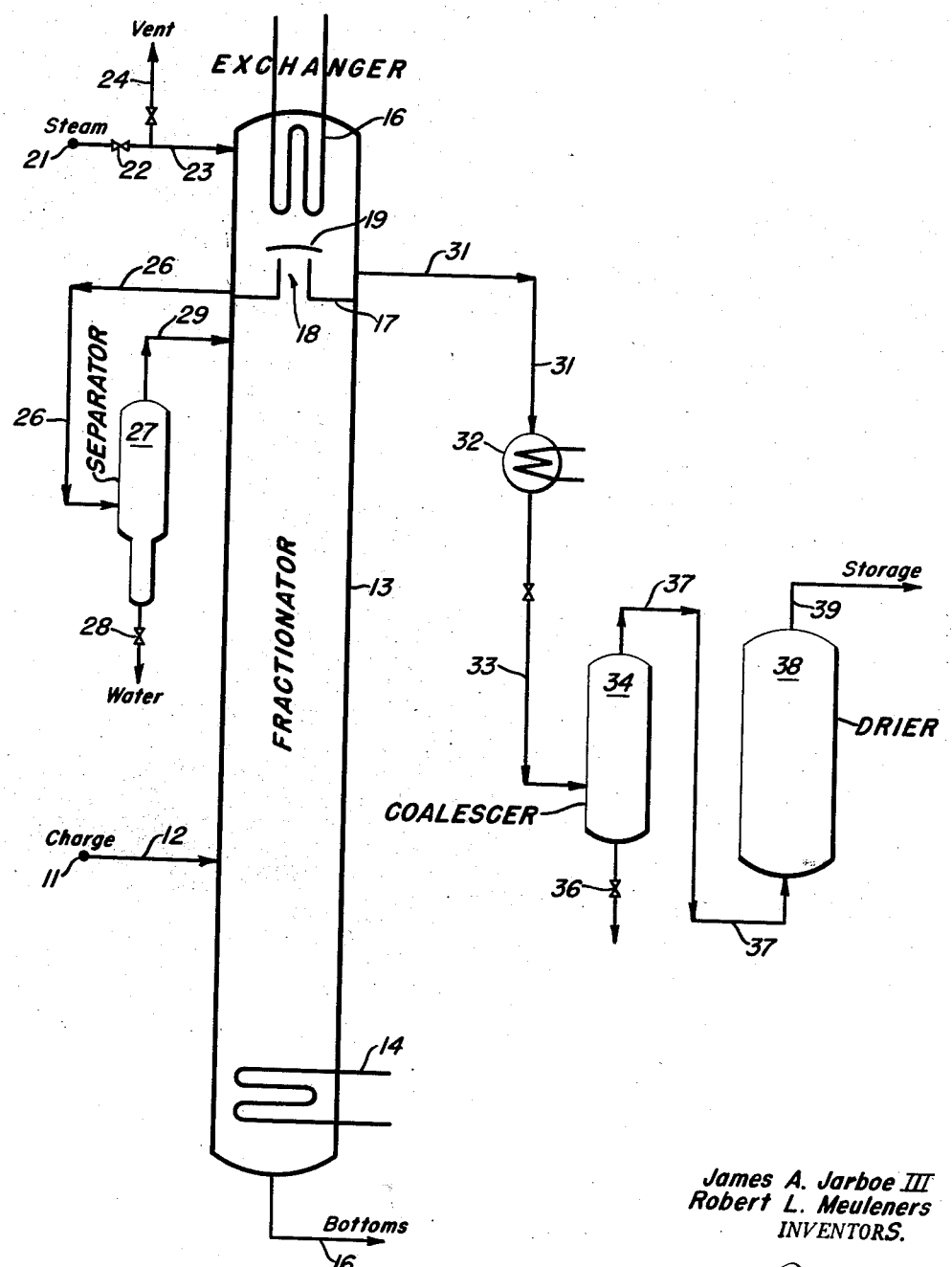
James A. Jarboe III
Robert L. Meuleners
INVENTORS.

2,797,191

METHYL MERCAPTAN DISTILLATION

James A. Jarboe III, Texas City, and Robert L. Meuleners, Galveston, Tex., assignors to The American Oil Company, Texas City, Tex., a corporation of Texas Application October 26, 1955, Serial No. 542,828

4 Claims. (Cl. 202—39)

This invention relates to the production of methyl mercaptan from methanol. More particularly the invention relates to the production of methyl mercaptan product which is essentially anhydrous and contains not more than 0.2 mole percent of methanol.

Methyl mercaptan is now an important item of commerce for the synthesis of methionine. Presently methyl mercaptan is being produced by the reaction of methanol and hydrogen sulfide. The reaction product mixture contains principally methyl mercaptan, dimethyl sulfide, water and some other reaction product as well as hydrogen sulfide and small amounts of secondary reaction products. The reaction product, after being freed of hydrogen sulfide, is separated into a methyl mercaptan product fraction and a recycle bottoms fraction by fractional distillation. Some methanol passes overhead with the methyl mercaptan as well as some water. It is relatively easy to remove the occluded and dissolved water from the methyl mercaptan and produce a material which is essentially anhydrous as evidenced by a cloud point of −35° F. It is extremely difficult with any practical distillation column to free the methyl mercaptan product fraction of methanol to the extent desired by methionine producers, namely, a methyl mercaptan product containing not more than 0.20 mole percent of methanol and preferably not more than 0.10%.

An object of the invention is a process for producing methyl mercaptan of satisfactory water and methanol content by fractional distillation from the reaction product of a methanol and H$_2$S methyl mercaptan process. Another object is a fractional distillation operation for the recovery of methyl mercaptan having a methanol content of not more than 0.2% from the reaction product of a methanol-H$_2$S mercaptan process. Other objects will become apparent in the course of the detailed description of the invention.

The invention is described in connection with the annexed figure which forms a part of this specification. It is to be understood that the annexed figure shows only one embodiment of the invention and that those skilled in the fractional distillation art will readily devise modifications of this embodiment, which modifications are intended to come within the scope of the claimed invention.

In the figure, charge from source 11 is passed by way of line 12 into a lower portion of fractionator 13. The charge to the fractionator 13 is the product of the reaction of methanol and hydrogen sulfide to produce principally methyl mercaptan. In addition to the methyl mercaptan, there is present unreacted methanol and water reaction product. There is formed in the reaction the side reaction products dimethyl ether and dimethyl sulfide. In addition to this, small amounts of higher boiling mercaptans resulting from impurities in the hydrogen sulfide are also present. The fractional distillation tower 13 is a conventional tower provided with liquid-vapor contacting means. It is preferred that fractionator 13 be provided with bubble caps. In the lower part of fractionator 13, there is positioned a heat exchanger means 14.

In fractionator 13, the charge is distilled into a bottoms product fraction consisting almost entirely of methyl mercaptan, dimethyl sulfide and water. The bottoms product fraction is withdrawn from fractionator 13 by way of line 16. The bottoms fraction may be treated to recover the mercaptan and dimethyl sulfide or may be recycled to the reactor.

Fractionator 13 is provided with a heat exchanger means 16 positioned at the top or near the top of the tower. Exchanger 16 is adapted to condense the vapors passing up through the tower and reaching the upper portion thereof. Fractionator 13 is also provided with a trapout means 17 positioned below exchanger means 16. The vapors pass up through the chimney 18 in trapout 17 and on up into the upper portion of the tower where they are contacted by cold exchanger 16 and condensed into the liquid state. In this embodiment, trapout means 17 consists of a doughnut shaped baffle provided with chimney 18 and deflector 19. It is to be understood that other conventional arrangements for trapout of a liquid from a tower, either total trapout or partial trapout, may be provided in fractionator 13.

Steam from source 21 is passed by way of valved line 22 and line 23 into the top or near the top of fractionator 13. The steam can be vented to the atmosphere by way of vent 24. The steam enters the top of fractionator 13 above the trapout point where it intermingles with the condensing vapors and is itself condensed to form a fine mist of water which thoroughly contacts the condensing liquid. The vapors produced in fractionator 13 passing up through chimney 18 consist of methanol, methyl mercaptan, dimethyl ether, water and small amounts of dimethyl sulfide, higher boiling mercaptans and dissolved gases, such as hydrogen sulfide and carbon disulfide.

The condensed steam and the condensed vapor product are collected by trapout 17. Usually a lower liquid water layer and an upper liquid mercaptan layer will be present in trapout 17. A stream containing both liquid mercaptan phase and liquid water phase is withdrawn from trapout 17 by way of line 26 and is passed into separator 27. Separator 27 is a device adapted for the gravity settling of two immiscible liquid phases. The heavier water phase is withdrawn from separator 27 by way of valved line 28. The separated liquid mercaptan phase is passed from separator 27 by way of line 29 into fractionator 13 as reflux. The reflux is introduced in the fractionator 13 at an upper point but below the trapout 17.

An outlet is provided from fractionator 13 at a level such that substantially only the liquid mercaptan phase is withdrawn. This liquid mercaptan phase is withdrawn by way of line 31 and is passed through heat exchanger 32 where the temperature is reduced to about ambient. It is to be understood that instead of having two withdrawals from trapout 17, two separate trapouts may be used or even a single withdrawal line may be used. In the case of a single withdrawal line, all of the liquid mercaptan phase and liquid water phase would be trapped out, pass through a separator such as separator 27 and the liquid water phase gravity settled from the liquid mercaptan phase. A portion of the separated liquid mercaptan phase would then be returned to the fractionator as reflux. The remainder of the liquid mercaptan phase would then be treated as is described for the material withdrawn by way of line 31.

From cooler 32, the product methyl mercaptan stream now containing a dispersion of liquid water precipitated from solution is passed by way of valved line 33 into coalescer 34. Coalescer 34 may be any form of apparatus conventionally used for separating a dispersion of water from an organic liquid, for example, coalescer 34 may be filled with sand, gravel, steel wool, fiber glass, etc.

In this embodiment, coalescer 34 is filled with fiber glass. Coalesced water is removed from coalescer 34 by way of valved line 36 and is passed to disposal not shown.

The methyl mercaptan feed of dispersed water, hereinafter spoken of as "dewatered methyl mercaptan stream," is passed by way of line 37 into drier 38. Drier 38 may be any form of apparatus which will remove dissolved water from an organic liquid. Drier 38 may be provided with alumina, bauxite, or other chemical means. In this embodiment, drier 38 is filled with lumps of calcium chloride. The methyl mercaptan issuing from drier 38 is essentially anhydrous as determined by the cloud point requirement and has a methanol content of not more than the specification amount of 0.20 mole percent. This essentially anhydrous methyl mercaptan product is passed to storage by way of line 39.

The amount of steam introduced into fractionator 13 is dependent upon the amount of methanol which must be removed from the methyl mercaptan vapors in order to meet the product specification of 0.20 mole percent. It is apparent that the amount of steam utilized will fluctuate with the changes in operation of the tower and particularly with change in the charge. In general the amount of steam introduced is between about 0.25 and 3 pounds per gallon of methyl mercaptan product plus the methyl mercaptan reflux. To illustrate: the amount of steam is based on the gallons of methyl mercaptan passed to storage by way of line 39 plus the methyl mercaptan reflux by way of line 29. More usually, the steam usage is between about 0.4 and 1 pound per gallon of methyl mercaptan product plus methyl mercaptan reflux.

*Example*

Operation on a large scale unit wherein fractionator 13 was operated at a tower top pressure measured just below the trapout pan 17 of 63 p. s. i. g. The tower top temperature was 126° F. and the temperature of the stream leaving the bottoms by way of line 16 was 146° F. An external reboiler was utilized to heat the bottoms product and the reboiler returned the material into the bottom of the tower at 155° F.

The bottoms product in line 16 was 0.24 gallon per minute, while a methyl mercaptan product from line 39 was 0.74 gallon per minute. The reflux rate through line 29 was 1.88 gallons per minute.

Analysis of the methyl mercaptan product from line 39 and the bottoms product from line 16 are set out below.

| | Product After Drying, Mol Percent | Bottoms, Mol Percent |
|---|---|---|
| $CH_3SH$ | 98.15 | 43 |
| $H_2S$ | 0.03 | |
| $CS_2$ | 0.22 | |
| $C_3H_7SH$ | 0.03 | |
| $C_2H_5SH$ | 0.11 | |
| $(CH_3)_2S$ | 0.17 | 48 |
| $(CH_3)_2O$ | 1.18 | |
| $CH_3OH$ | 0.11 | |
| $H_2O$ | | 9 |
| Cloud Point, ° F. | −34 | |

Operating fractionator 13 without the introduction of steam by way of line 23, the methyl mercaptan product contained from 0.25 to as much as 0.6 mole percent of methanol. By introducing from 70 to 80 pounds of steam per hour, by way of line 23, into the upper portion of fractionator 13, the methanol content of the methyl mercaptan product was dropped to typically 0.17 mole percent. By adjusting the steam addition rate, it is possible to reduce the methanol content of the methyl mercaptan product to 0.10 mole percent.

Thus having described the invention, what is claimed is:

1. In the production of methyl mercaptan wherein a charge consisting essentially of methyl mercaptan, dimethyl sulfide, dimethyl ether, methanol and water is introduced continuously into a fractional distillation tower provided with exchanger means in the top thereof for condensing methyl mercaptan vapors, a stream containing liquid methyl mercaptan and liquid water phases being trapped out and the liquid methyl mercaptan phase separated from the liquid water phase, a portion of the liquid methyl mercaptan phase recycled to the tower as reflux, the remainder of the liquid methyl mercaptan phase being made essentially anhydrous and also characterized by a dissolved methanol content of more than 0.20 mole percent, the improvement wherein steam is introduced into the top of the tower in an amount such that the methanol content of the substantially anhydrous methyl mercaptan is not more than 0.20 mole percent.

2. The improvement of claim 1 wherein the amount of steam introduced is between about 0.25 and 3 pounds per gallon of methyl mercaptan product plus methyl mercaptan reflux.

3. A process which comprises continuously introducing into a fractional distillation tower at a lower point thereof a charge consisting essentially of methyl mercaptan, dimethyl sulfide, dimethyl ether, methanol and water, withdrawing a bottoms product from said tower consisting essentially of methyl mercaptan, dimethyl sulfide and water, introducing steam into said tower at a point near the top thereof, condensing by means of a heat exchanger located in the top of said tower said steam and the methyl mercaptan enriched vapor stream produced within said tower, withdrawing from a trapout point below said exchanger and said steam entry points a stream containing a liquid methyl mercaptan phase and a liquid water phase, separating said phases and introducing the separated methyl mercaptan phase as reflux into said tower below the trapout point, withdrawing from a trapout point located in said tower below the heat exchanger means and steam inlet a methyl mercaptan product fraction stream, passing said product stream through cooling means to produce a cooled stream containing a separate water phase, separating the water phase from the methyl mercaptan phase of said cooled stream, and removing dissolved water from said dewatered methyl mercaptan stream to produce an essentially anhydrous methyl mercaptan product containing less than 0.2 mole percent of dissolved methanol.

4. The process of claim 3 wherein the amount of steam introduced is between about 0.4 and 1 pound per gallon of methyl mercaptan product plus methyl mercaptan reflux.

References Cited in the file of this patent

UNITED STATES PATENTS

| | | |
|---|---|---|
| 2,309,652 | Leum et al. | Feb. 2, 1943 |
| 2,309,653 | Leum et al. | Feb. 2, 1943 |
| 2,320,939 | Leum | June 1, 1943 |
| 2,472,499 | Stone | June 7, 1949 |
| 2,533,992 | Brunjes | Dec. 12, 1950 |
| 2,550,091 | Seebold | Apr. 24, 1951 |